United States Patent [19]

Schell

[11] 3,872,014

[45] Mar. 18, 1975

[54] MEMBRANE SEPARATION APPARATUS

[75] Inventor: William J. Schell, Manhattan Beach, Calif.

[73] Assignee: Aerojet-General Corporation, El Monte, Calif.

[22] Filed: Mar. 11, 1974

[21] Appl. No.: 449,605

[52] U.S. Cl. .................. 210/232, 55/158, 210/321, 210/433, 210/494
[51] Int. Cl. ............................................ B01d 31/00
[58] Field of Search ........... 210/232, 321, 433, 494, 210/487; 55/16, 158

[56] References Cited
UNITED STATES PATENTS
2,883,058 4/1959 Jaume .............................. 210/487
3,827,564 8/1974 Rak ................................ 210/494 X Primary Examiner—Frank A. Spear, Jr.
Attorney, Agent, or Firm—Edward O. Ansell; T. Reid Anderson

[57] ABSTRACT

A module of a convolute design employing a permselective membrane suitable for use in separating a permeate from a fluid mixture of the general type employing two permselective membranes spaced from each other by a backing member to provide a first fluid passageway therebetween in which membrane permeate collects. The module employs a generally-hollow mandrel having a wall intermediate its length dividing the mandrel into a first compartment and a second compartment with means for introducing a fluid feed stream to the first compartment and means for removing an effluent fluid stream from the second mandrel compartment with means defining a second fluid passageway for presenting the fluid feed to the outside of the two permselective membranes upon the spiral wrapping of the two membranes about the mandrel. The second passageway is divided into two juxtapositioned regions, which two regions at a spaced distance from the mandrel are interconnected to direct flow of the fluid feed from the first region into the second region, with the first region being in fluid communication with the first compartment of the mandrel so as to receive the incoming fluid feed and said second region being in fluid communication with the second mandrel compartment through which the effluent feed stream is removed from the module. The first fluid passageway which has a spiral configuration in the assembled module may be open at one or both ends, through which openings the fluid permeate leaves the module in the case of ultrafiltration, reverse osmosis or gas separation. Where the module of the invention is being employed in dialysis, there will be separate extraneously-introduced fluid streams to the first and second passageways, respectively, of the structure and in such event it will be necessary to modify the module to have means for introducing a fluid stream to one end of the first fluid passageway, from which location the fluid flows through the passageway in a generally-parallel direction to and exteriorly of the mandrel to the other end of the module whence it is removed.

20 Claims, 13 Drawing Figures

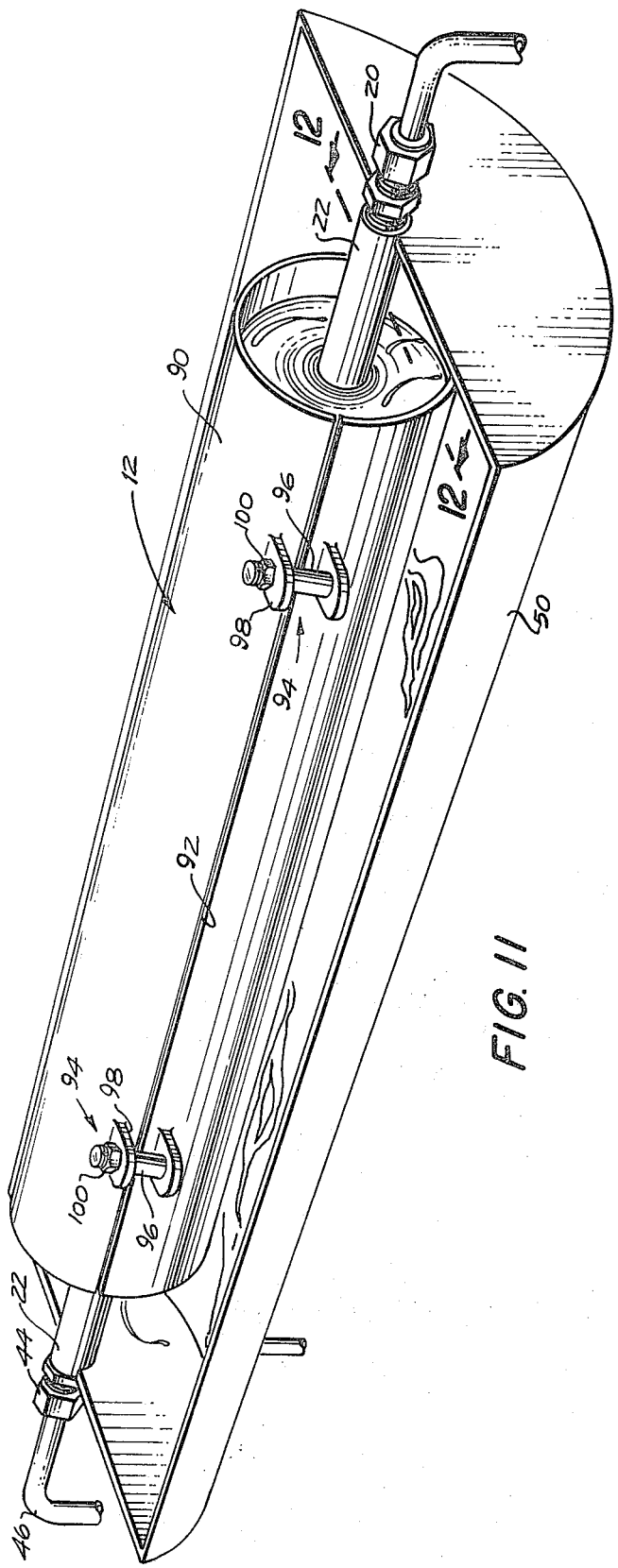
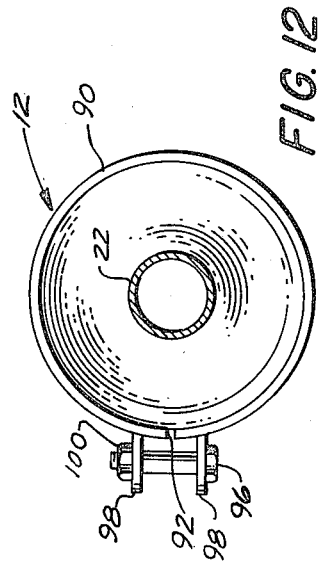

MEMBRANE SEPARATION APPARATUS

This invention relates to a semipermeable membrane fluid separation apparatus and more particularly to a module of a convolute design employing a permselective membrane suitable for use in separating a permeate from a fluid feed.

A prior art convolute module, sometimes referred to as a spiral wrap module, characteristically employs one or more leaves with each leaf made up of two permselective membranes spaced from each other by a separator grid material through which the fluid feed flows. Typically, the membrane is formed from a single elongated membrane sheet, which is folded intermediate of its length to provide a membrane sandwich with the grid material between the membrane folds and with the active separation surfaces of the opposing folds of the membrane sheet facing the grid material, thus completing the sandwich structure. A porous backing material is placed immediately adjacent thereto and upon spiral wrapping the membrane sandwich and backing material tightly about a central mandrel, there is formed a compact roll which is encased in a cylindrical, close-fitting pressure vessel. The fluid, e.g., brackish water, whey, or gas mixture being processed is admitted to one end of the pressure vessel and flows through the separator grid between the adjoining folded membrane leaves of the sandwich in a direction generally parallel to the mandrel. In a typical fluid separation, such as brackish water, a substantially purified product water (permeate) diffuses through the opposing membrane leaves of the sandwich and is absorbed into the porous backing material which transports the product water in a generally radial direction to the interior of the mandrel through which the purified water product is removed to the exterior of the module.

It will be appreciated that the fluid feed, for example brackish water or other liquid, when removed from the opposite end of the prior art pressure vessel after flowing lengthwise thereof through the separator grid of the leaf sandwich and exteriorly of the mandrel will have a higher solute concentration than the entering feed stream. The product water or permeate which flows laterally through the porous spiral backing material is subjected to a drop in pressure from the point where it diffuses through the membrane to the point where it enters the mandrel tube.

The pressure-cylinder spiral wrap design of the prior art has, with use, demonstrated certain shortcomings. For example, in the processing of whey or other suspended solid feed streams, there is a tendency for plugging to occur in the grid area of the membrane sandwich through which the whey flows, thus reducing the capacity of the module and sometimes leading to a nearly-full clogging of the feed flow passageway. In such usage of the module, which is sometimes described as ultrafiltration in contract to reverse osmosis, the description employed for the processing of brackish water and other salt solutions, the product stream is frequently the concentrated feed (concentrated whey) rather than the permeate water. In contrast, the permeate water is often recovered as the product stream in a reverse osmosis treatment of, for example, brackish water.

One embodiment of the module of the invention is especially suitable for the processing of suspended solid streams, such as whey, in having an essentially-open, unobstructed feed passageway, and it has the further advantage of incorporating an integral, reinforcing outer pressure wrap. This obviates the need for a separate cylindrical pressure vessel as was heretofore required for operation of the prior art module.

The module of the invention, while employing a permselective membrane for use in separating a permeate from a fluid mixture, differs radically from the conventional structure in utilizing a generally-hollow mandrel having a wall intermediate its length which divides the mandrel into a first compartment and a second compartment with means for introducing a fluid feed stream to the first mandrel compartment and means for removing an effluent fluid stream from the second mandrel compartment. Two permselective membranes are spaced from each other by a backing material to provide a leaf having a first fluid passageway between the two membranes in which the membrane permeate collects in reverse osmosis and ultrafiltration usages of the module. There is provided a means defining a second fluid passageway for presenting the fluid feed to the outside of the two membranes of the leaf upon the spiral wrapping of the two membrane leaves about the mandrel. This second passageway is divided into two juxtapositioned regions which two regions at a spaced distance from the mandrel are interconnected to direct flow of the fluid feed from the first region into the second region with the first region being in fluid communication with the first compartment of the mandrel, so as to receive the incoming fluid feed. The second region of the second fluid passageway is in fluid communication with the second compartment of the mandrel, from which the effluent fluid stream is removed. Means are provided permitting removal of permeate from the first fluid passageway to the exterior of the module, together with means for restraining the unspiralling of the compact rolled module under operational conditions. In a sense, the mode of operation of the module of the invention is the reverse of the conventional and, because of this, the module of the invention can be described as an inverse spiral module membrane separation device.

The module of the invention may be used for fluid separations, both liquid and gas, of various types including ultrafiltration, reverse osmosis, dialysis and various gas separations. The components of the preferred module will vary somewhat from usage to usage. For example, in a module used for the concentrations of whey and other liquids having suspended solids, the second fluid passageway means may be formed from a flexible sheet material in which there has been cut or formed two generally-paralleling open channels, which open channels provide the aforementioned two juxtapositioned and interconnected regions through which the feed stream flows. The two channels being principally free of any obstructions have little tendency to clog with suspended solids as is characteristic of the prior art module in some usages. Desirably, the flexible sheet material out of which the two open channels are formed is very thin, e.g., a thickness of 10 to 100 mils (0.25 to 2.5 mm) which provides correspondingly thin channels. Such thin channels are known (see Ind. Eng. Chem. Prod. Develop., Vol. 11, No. 3, 1972. p. 235) to promote hydrodynamic shearing at the adjacent membrane surfaces with fluid flow therethrough. Their usage thereby minimizes concentration polarization which, thus, increases permeate flow through the membranes into the first fluid passageway. Additionally, it has been found that hydrodynamic shearing and consequent minimizing of concentration polarization may be further promoted by progressively diminishing in width the two adjoining channels in the direction of fluid flow therethrough. It will be appreciated that with the foregoing tapering of the two channels in direction of fluid flow there is provided an accommodation for the loss of membrane permeate into the adjoining first passageway and the proportional decrease in volume flow of the fluid feed as it progresses successively through the two channels.

Where the module of the invention is being used for gas separation, there is of course no problem of channel plugging due to suspended solids and a grid sheet material (netting) may be conveniently employed as the second fluid passageway means with no necessity to cut open, unobstructed channels therein. In one embodiment adapted to ultrafiltration of suspended solid liquids, the same flexible grid sheet, but with open channels cut or formed therein, is utilized by employing adhesive line barriers to confine fluid flow to the cut-out channels.

The first fluid passageway in the module of the invention has substantially the length of the module itself which is significantly shorter than the permeate flow path of the prior art spiral design wherein the permeate flows laterally in a radially spiralling direction through porous backing material to the interior of the mandrel. Thus, it is apparent that permeate back pressure in the module of the invention is minimized due to the short permeate path length which represents a significant advantage in reverse osmosis, ultrafiltration and especially in gas separation. In any of the foregoing processes, as is readily apparent in FIG. 1, the permeate back pressure may be further halved by leaving the module open at both ends, thus permitting the permeate upon entering the first passageway to move in either direction, depending upon the direction of least resistance at the particular location.

The backing material positioned in the first fluid passageway between the two permselective membranes of the leaf may take various forms for various usages. In one embodiment the backing material comprises a flexible tricot spacer cloth which typically is polyester fabric which may or may not be impregnated with a stiffener. The knit of the tricot fabric is desirably relatively open to promote high fluid flow. In some applications, for example, in dialysis, where there are extraneously-introduced fluid streams to both the first and second passageways of the module structure it may be desirable to employ a flexible polymeric grid sheet as the backing material in the first fluid passageway and possibly also in the second passageway. In the instance of ultrafiltration and reverse osmosis, it may be desirable in some applications to employ an impervious backing material between the two permselective membranes of the leaf and in this instance, the impervious backing material may take the form of a flexible polymeric sheet with very fine corrugations thereon, the grooves of which serve to conduct the permeate through the first fluid passageway to the exterior of the module. In another embodiment of the module of the invention, the permselective membranes are cast on permeable, polymeric cloth which polymeric cloth itself may serve as backing material in defining the first fluid passageway. The polymeric cloth is desirably a polyester material (DuPont's Dacron) similar to that presently used in the manufacture of the prior art spiral modules. In one favored structure of the invention, the two permselective membranes are cast on permeable polymeric cloth (preferably polyester) and a tricot spacer cloth is located therebetween. Typically, the two membranes are formed from a single elongated membrane sheet which is folded intermediate of its length to provide the two opposing membranes that form the leaf with the first fluid passageway therebetween. The single elongated membrane sheet is prepared by casting a suitable membrane solution thereon and processed as well known in the art, e.g., see U.S. Pat. No. 3,497,072 to Cannon, to form thereon an asymmetric membrane whch has a relatively thin active layer made up of a compacted mass of polymeric molecules and a second relatively thicker open layer which is intermeshed with the polymeric cloth. The second relatively thick layer is characterized by an open cell structure formed of the same polymeric material as the thin active layer. It is well known in the art to select appropriate casting solutions and processing conditions to prepare membranes of varying capabilities which may be used for ultrafiltration, reverse osmosis, dialysis and gas separations, and it need not be repeated here.

The permselective membrane is most often asymmetric in structure for ultrafiltration, gas separation and reverse osmosis, although symmetrical membranes may be desirably employed in dialysis. The thin active layers of the asymmetric membranes are spaced away from the backing material, that is to say, the backing material adjoins the open cell structure side of the asymmetric membranes. It will be appreciated that with this arrangement the fluid feed of the second fluid passageway is in contact with the active, thin layers of the two membranes of the leaf and the permeate passes therethrough and collects in the first fluid passageway defined by the backing material. Permselective membranes allow the passage of certain ionic species or molecules in preference to others by virtue of difference inter alia, in diffusion rates, solubility in the membrane, or size.

The module of the invention may be formed with a plurality of laterally-extending, co-extensive leaves which are separately in fluid communication with the two compartments of the mandrel with each leaf of the structure comprising as described above two permselective membranes with a first fluid passageway therebetween and with means being provided which define a second fluid passageway for presenting fluid feed to the outside of the two membranes of each of the respective leaves. The plurality of leaves are spirally wrapped around the mandrel in overlapping relationship one upon the other to form a roll comprising the compact module.

The means for restraining unspiralling of the wrapped leaf or leaves under operating conditions may take various forms. A presently preferred restraining means comprises a fiberglass-reinforced Mylar (a DuPont polyethylene terephthalate material) industrial tape having the full width of the module which tape is wrapped tightly around the compacted spiral wrap module and, in effect, providing a continuum of the outermost spiral of the leaf and thus, acts as an integral pressure vessel. The foregoing Mylar industrial tape is supplied with a contact type adhesive which serves to bond the exteriorly-located wrapping tape to the outer layer of the spiral wrap structure and for bonding each succeeding wrap of the tape to the preceding. For some applications, a flexible, thin metal sheet may be employed for the exterior wrapping material.

The upper operational pressure limit for the module cannot exceed the strength of the outer wrapping nor that of the bond formed by the adhesive for holding the succeeding wraps of the spiral structure together. Because of the foregoing pressure limitations, the module of the invention where relying solely on an integral outer tape wrapping, has been found most useful for ultrafiltration processing, which is characteristically carried on at relatively low operational pressures and for reverse osmosis processing of solutions of low solute concentrations. It will be appreciated that the osmotic pressure of the solution is directly related to the concentration of the solute. Since in reverse osmosis, the operating pressure exceeds the osmotic pressure, the tape-wrapped module of the invention is generally limited to processing of solutions of relatively low solute concentrations. The tape-wrapped module is also particularly useful in dialysis processing and gas separations which, for the most part, are carried on at relatively low pressures. The spiral wrapped structure of the invention may be strengthened to withstand still higher operating pressure by encasing the structure in a snugly-fitting metal tube or cylindrical pressure vessel which, thereby, forms a portion of the integral module structure.

The difference in the mode of operation and change in arrangement of the structural components of the module of the invention compared to the prior art structure will be better understood in the description following wherein:

FIG. 7 is a perspective view of the mandrel utilized in the structure of FIG. 2a;

FIG. 11 is a perspective view of the module of the invention adapted to an installation for a high pressure reverse osmosis operation; and FIG. 12 is an end elevation view of the module of the system of FIG. 11.

Figure 1:
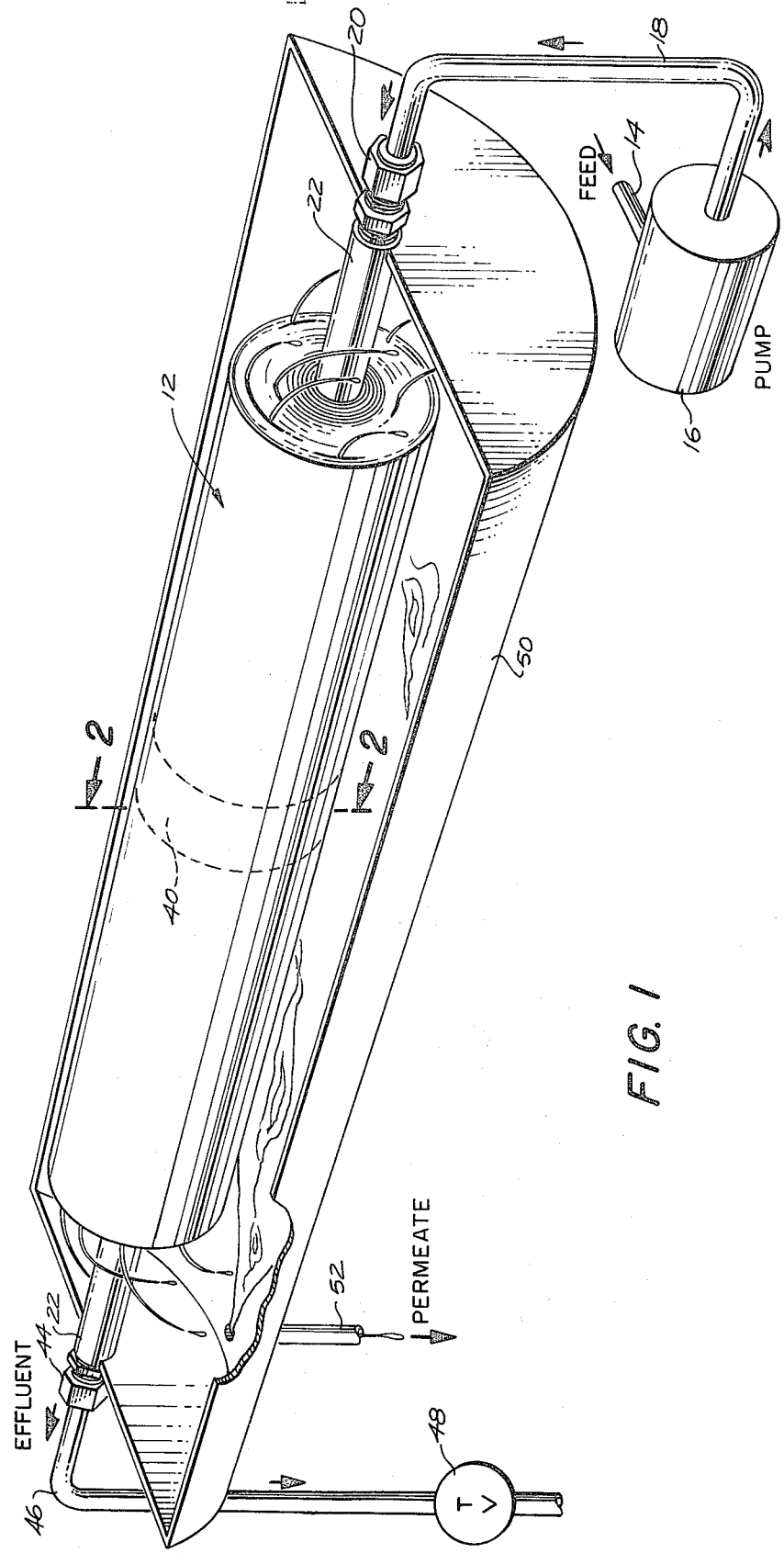
FIG. 1 is a perspective view of a possible installation of the module of the invention for ultrafiltration or reverse osmosis treatment of a liquid stream.

Referring to FIG. 1, there is illustrated a module 12 incorporated in a system suitable for a relatively low pressure reverse osmosis treatment of a stream of low solute concentration, e.g., a brackish water of low salinity, or for the ultrafiltration processing of cheese whey or other liquid streams containing, e.g., colloidal suspensions and suspended solids. It will be appreciated that the particular membrane employed will be selected to accomplish the separation desired in the processing of the particular liquid feed stream.

Figure 4:
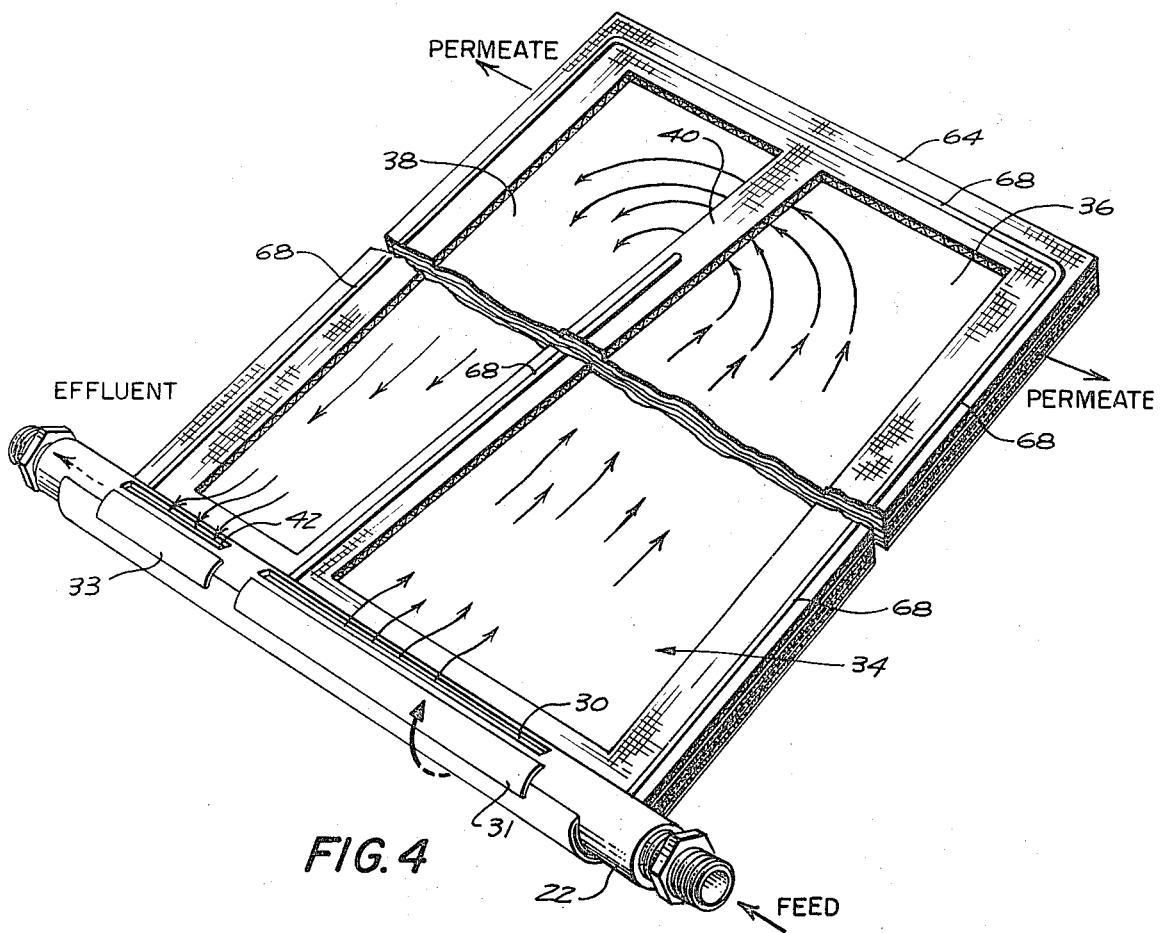
FIG. 4 is a perspective view of a membrane layup, at a later stage of fabrication from that of FIG. 3, showing an alternative embodiment of the membrane module of the invention.
Figure 6:
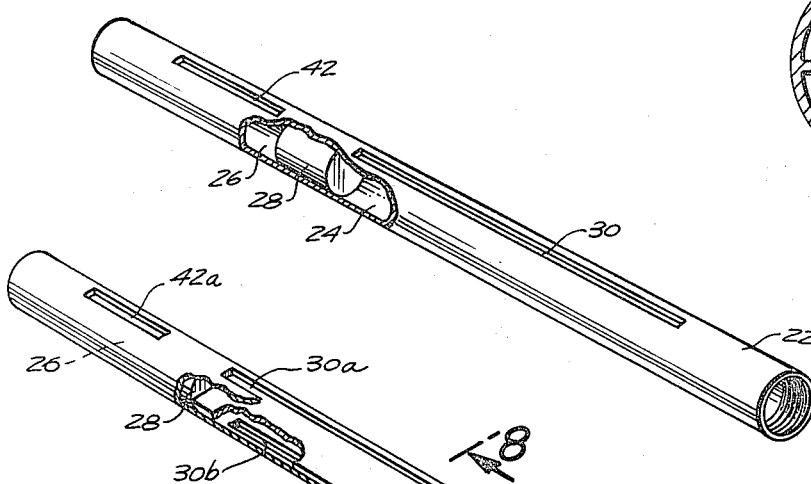
FIG. 6 is a perspective view, partially cutaway, of a mandrel employed in the module of FIGS. 1 and 2.

In FIG. 1 the feed stream being processed is introduced by a line 14 to a pump 16 from where it is passed at an elevated pressure through a pipe 18 and coupling 20 to a mandrel 22 of a module 12. As seen in FIG. 6 the mandrel 22 is divided into a first compartment 24 and a second compartment 26 by a plug 28 situated intermediate the length of the mandrel. As illustrated in FIG. 4, the feed stream entering the mandrel 22 is diverted by the plug 28 (FIG. 6) through an elongated slit 30 of the mandrel wall into a passageway 34 (hereafter conveniently defined as the second passageway) of a laterally-extending leaf structure (illustrated diagrammatically in the layup of FIG. 4 in an unspiralled condition). The second fluid passageway 34 is divided into a first region 36 and a juxtapositioned second region 38 which two regions of the passageway 34 are interconnected at the far end of the passageway 34 through a porous bridge 40. The feed stream less the permeate passing through the adjoining membrane surface is returned via the second region 38 of the passageway 34 to a second slit 42 in the mandrel wall through which latter slit the feed stream enters the second compartment 26 of the mandrel from whch it is removed as the processed stream effluent (see FIG. 1) via a coupling 44 to an outlet pipe 46 which contains a throttling valve 48, the adjustment of which regulates back pressure and effects flow-through velocity of the feed stream. In the particular installation illustrated membrane permeate escapes from both ends of module 12 into the shallow collection basin 50 whence the permeate product is removed through a pipe 52. It will be appreciated that one end of the module could be closed off and the permeate removed from only the opposite end.

Figure 2:
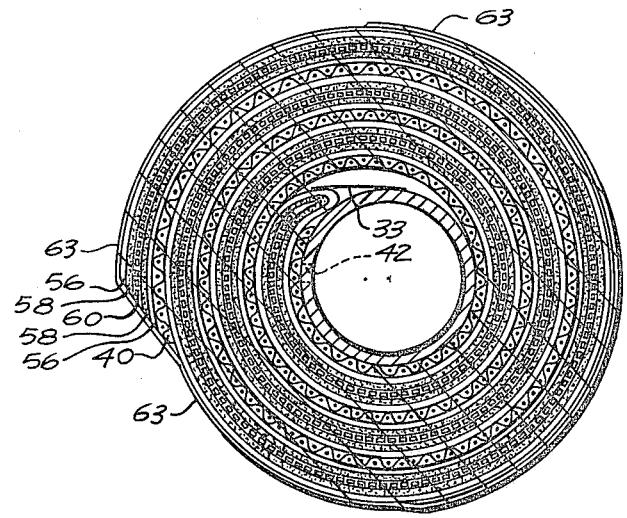
FIG. 2 is a cross-sectional view taken along line 2—2 of FIG. 1 and showing schematically the module in a preferred embodiment, employing a single leaf made up of two spaced membranes spirally wrapped to form a compact structure.
Figure 3:
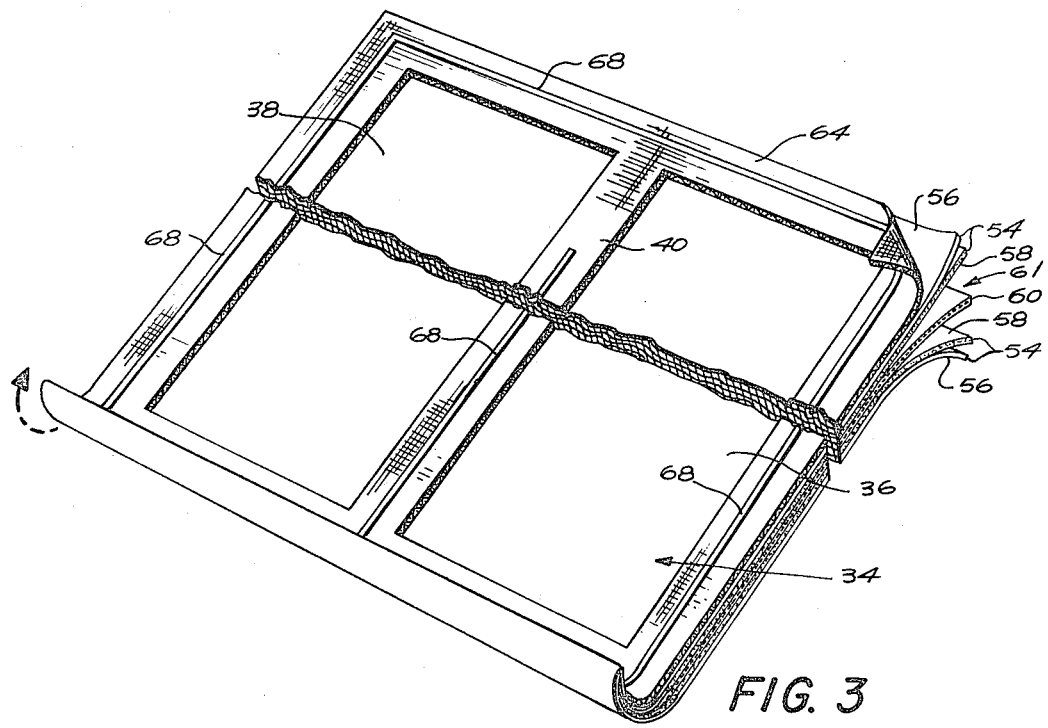
FIG. 3 is a fragmentary, perspective view of one stage of a membrane layup employed for fabrication of the membrane module of FIGS. 1 and 2.

The structural details of the module 12 are further disclosed by reference to FIGS. 2—6. FIG. 3 is a perspective view of one stage in the membrane layup employed for fabrication of the module. It precedes in time the fastening of the layup to the mandrel (see FIG. 4) by positioning tape strips 31 and 33 and the rolling or spiralling of the layup about the mandrel to form a compact roll as shown schematically in completed form in FIG. 2. The correct positioning of the layup with respect to the mandrel outlet slits 30 and 42 may be achieved with contact adhesive in place of or in addition to the tape strips 31 and 33. The mandrel outlet could take the form of a series of holes. The mandrel outlet and membrane layup are so oriented to assure feed flow with minimum pressure loss into the second passageway 34.

The interrelation of components of the leaf structure of the module 12 is perhaps best understood with reference first to FIG. 3 where it is seen that the membrane 54 is formed from an elongated sheet material which is folded intermediate of its length to provide two opposing permselective membranes which are separated by a backing material 60 which defines a first fluid passageway 61 therebetween in which membrane permeate may collect. The aforementioned single elongated membrane sheet is prepared by casting a suitable membrane solution upon a permeable polymeric base cloth and processed under conditions well known in the art to form an asymmetric membrane which is illustrated diagrammatically in FIG. 3 to have a relatively thin active layer 56 and a thicker porous second layer 58 which is intermeshed with the polymeric base cloth. While the two layers are shown for illustration purposes as separate, they are in reality an integral structure and the active layer 56 is much thinner than illustrated. The elongated membrane sheet when folded intermediate of its length has the active layer 56 facing outwardly.

Figure 10:
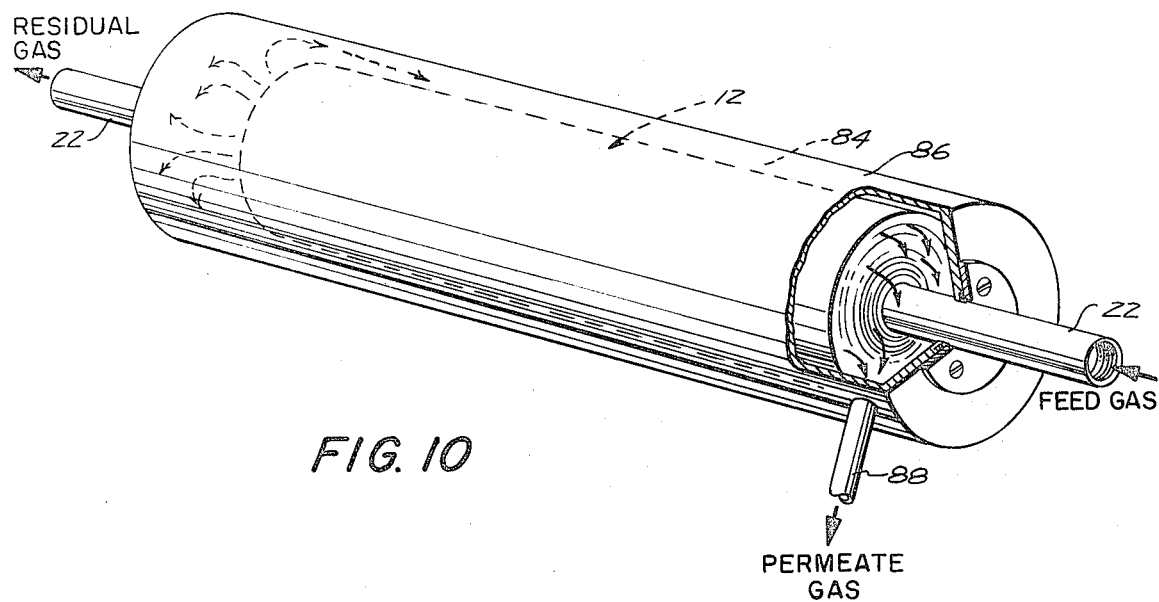
FIG. 10 is a cutaway, perspective view of an installation incorporating the module of the invention in a system for the processing of a gaseous stream to separate a component therefrom.

The backing material 60 of the first passageway 61 may take various forms and for instance, where the module is being employed for ultrafiltration or possibly low pressure reverse osmosis separations, the backing material may be a tricot spacer cloth with the openings of the tricot fabric being relatively loose so as to promote high fluid flow of the permeate through the first passageway in a generally-parallel direction to the mandrel 22. The backing material 60 need not be permeable but may conveniently comprise in some applications an impermeable, flexible, thin sheet (usually polymeric) which has formed on its opposite surfaces fine corrugations which serve to transport the permeate to the opposite ends of the module. Where the module is being utilized in gas separation as illustrated in FIG. 10, the backing material may take even a still different form and comprise a very open grid sheet which presents still less impedance to fluid flow. A DuPont open grid netting (discussed below) marketed under the trademark Vexar, is a suitable material. Thus, it is seen the backing material like the particular membrane employed is selected to optimize the particular separation being accomplished. Details of membrane casting solutions and casting conditions that may be employed for membrane fabrication are well known to the art and not forming a part of the instant invention, are not elaborated upon here.

Figure 5:
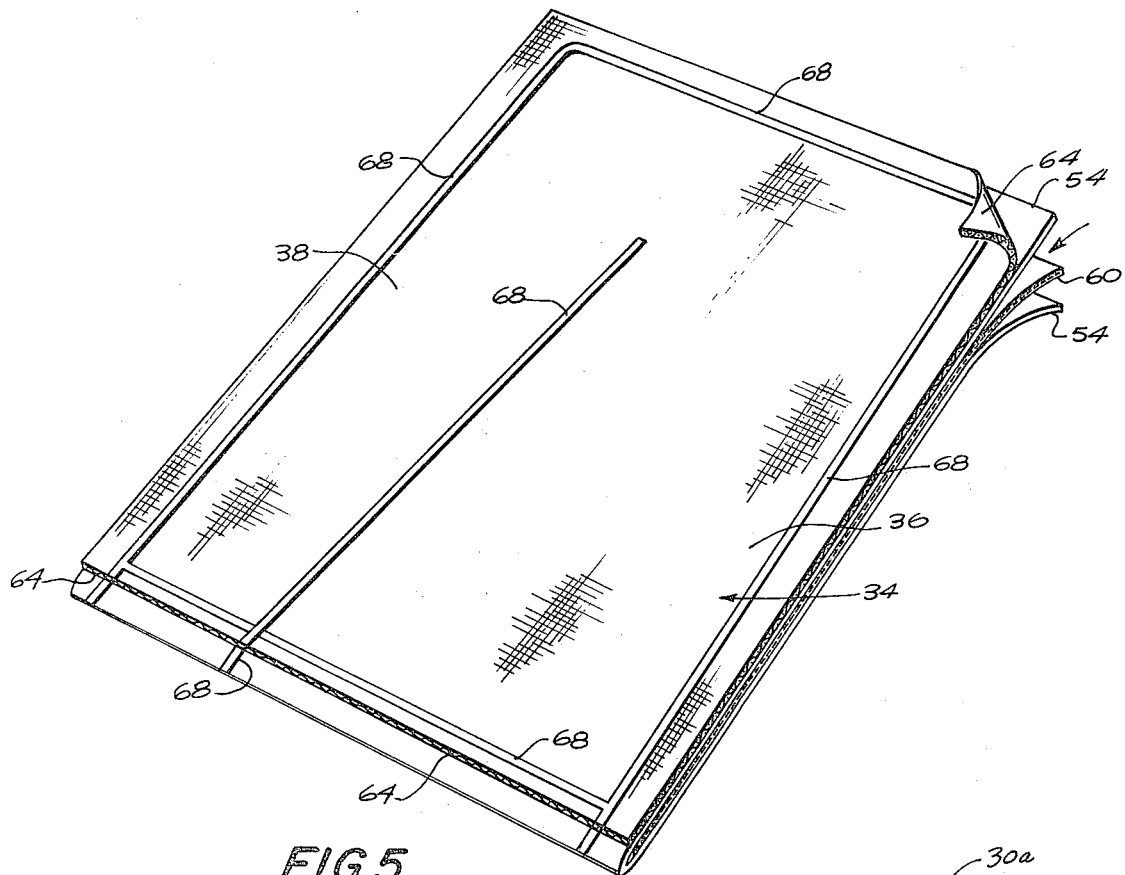
FIG. 5 is a perspective view of a membrane layup at an early stage of a still another embodiment of the module of the invention.

As mentioned earlier with reference to FIG. 4, and as similarly illustrated in FIGS. 3 and 5, there is a second fluid passageway 34 which serves the purpose of presenting the fluid feeding being processed to the outside or active thin layers of the permselective membranes. The means for defining the second fluid passageway 34 may take the form of a very open fabric or an open grid sheet material in the form of a netting spacer 64 through which the fluid feed readily flows. A particularly suitable material for this purpose is a product marketed by DuPont under the trademark Vexar which is available in various thicknesses and different mesh openings. Depending on the application, openings of one to six millimeters have been found suitable. The thickness of the open grid material may be varied by using a plurality of layers as well as by selection of a netting of a satisfactory initial thickness where available. For reasons discussed more thoroughly hereafter, the spacer element defined by the netting 64 will typically have a thickness of 10 to 100 mils (0.25 to 2.5 mm). The netting material is available in various plastics such as polyethylene, polypropylene and vinyl. The netting spacer 64 in the embodiments of FIGS. 3 and 4 has a fluid flow passageway 34 comprising two thin, open, generally-paralleling channels 36 and 38 which have been cut out of the netting spacer material 64 and which interconnect at a distance spaced from the mandrel 22 through a porous bridge 40 of the netting. Adhesive lines 68 serve to define the boundaries of the two succeeding fluid flow regions 34 and 36 and to confine the fluid therein, as well to bond the succeeding structure layers together upon the spiral wrapping of the membrane leaf and spacer sheet netting 64 about the mandrel 22 to form the compact structure which is illustrated in cross-section in FIG. 2. A particularly suitable adhesive for forming the adhesive line 68 is a commericially-available polyurethane material which is cured with a diamine and which sets up as a flexible solid with a variable cure time, typically of 24 hours or so. It will be appreciated that the adhesive in penetrating the interstices of the netting sheet 64 will in the spiral wrap structure effect a bonding of the netting spacer sheet to the membranes on either side of the netting spacer and additionally provide a barrier restricting the fluid feed to the passageway between the permselective membranes on either side.

It will also be appreciated that in place of the netting sheet spacer 64, the sheet spacer may be formed from a flexible, solid, non-porous plastic sheet and the interconnected channels 36 and 38 either cut or formed therein to provide the second passageway 34. In this latter modification, there is no porous bridge 40 between the adjacent channels 36 and 38 but rather an unobstructed opening therebetween. With use of the solid flexible plastic sheet spacer (instead of the netting spacer) the adhesive utilized is not applied in a thin line 68 but rather fully coats both sides of the plastic sheet spacer 64. Hence, the bond formed between the non-porous spacer sheet 64 and the adjacent membrane surfaces upon spiral wrapping of the structure may be significantly wider than that provided by the adhesive line 68.

It will be seen with reference to FIGS. 3 and 4 that the juxtapositioned channels 36 and 38 of the two lay-ups are of different configurations. In that of FIG. 3 the two succeeding channels 36 and 38 of the fluid feed passageway 34 are of the same length and width. It may be desirable in the processing of some fluid streams to resort to the channel configuration of FIG. 4 wherein it is seen the two successive juxtapositioned channels 36 and 38 progressively diminish in width in direction of the fluid flow. This is done in order to maintain fluid velocity which would tend to decrease with flow of the stream therethrough due to transfer of permeate through the adjoining membranes into the other passageway 61. it is preferred with the instant structure that the channel depth be within the range of 10 to 100 mils (0.25 to 2.5 mm). The foregoing thin channel approach, together with the tapering of the channels in the direction of fluid flow, contribute to a hydrodynamic shear at the membrane surface despite laminar flow which is characteristic of unobstructed open channels, thus minimizing concentration polarization such that suitable flux values are obtained.

The layup of FIG. 5 is illustrative of a structure especially suitable for processing of a gas stream as in the installation of FIG. 10. There it will be seen that the netting spacer element 64 has no open channels cut or formed therein as found in the structures illustrated in FIGS. 3 and 4 and, therefore, the two succeeding juxtapositioned flow regions 36 and 38 of the second fluid passageway 34 are wholly defined by the several adhesive barriers or lines 68. Like the structure of FIG. 4, the two successive fluid flow regions 36 and 38 of FIG. 5 progressively diminish in width in direction of fluid flow. The permselective membrane of this gas separation structure is asymmetrical in cross-section and as prescribed in the earlier structures of FIGS. 3 and 4, it is desirably formed in an elongated sheet which is folded intermediate of its length to provide the two opposing membranes with a backing member 60 located therebetween. For gas separations, the same open polymeric netting (Vexar) may be employed for both the second fluid passageway 34 (through which the gaseous feed stream flows) as well as for the backing material 60 of the first fluid passageway 61 in which the permeate gas collects.

The mandrel 22 illustrated in FIG. 6 is that used in the structures of FIGS. 4 and 5 where the first fluid flow region 36 as well as the second region 38 diminish in width in direction of fluid flow. Hence, the second slit 42 opening into the second mandrel compartment 26 is proportionately shorter in length than the first slit 30 of the first mandrel compartment 24. In dialysis the slits and the two compartments will be of equal length suitable for use with the second passageway 34 of FIG. 3. The mandrel may be formed of metal or plastic whichever best serves the intended use and is typically of the dimensions of 18 to 42 inches (45 to 107 cm) in length and ½ to 2 inches (1.2 to 5.1 cm) in outside diameter. The wall thickness is selected to provide the required structure strength. Polyvinylchloride is useful for many purposes.

Figure 8:
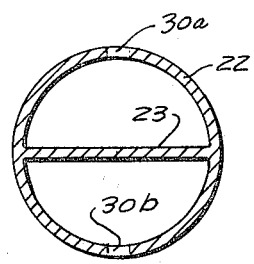
FIG. 8 is a cross-sectional view taken along line 8—8 of FIG. 7.
Figure 7:
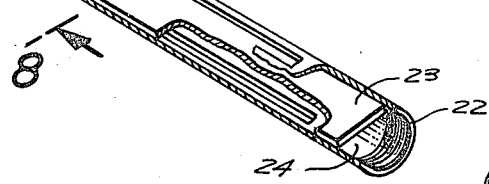

The mandrel of FIGS. 7 and 8 is intended for use in a spiral wrap module having two generally, laterally-extending coextensive leaves which are each separately in fluid communication with the two compartments 24 and 26 of the mandrel. The two leaf structure of FIG. 2a generally resembles that of FIG. 2, differing principally in having two leaves which are separately in fluid comunication with the two compartment mandrel of FIG. 7. With reference to FIG. 7 it is seen that the first compartment 24 is provided with a longitudinally-extending, horizontally-disposed and centrally-located plate 23 which divides the incoming fluid feed stream with half going to the mandrel outlet slit 30a and the other half to the diametrically-opposed outlet slit 30b. (This insures equal distribution of the feed to the two leaves.) The divided fluid feed stream is then introduced through the slits 30a and 30b to the two coextensive membrane leaves. The two leaves of the module of FIG. 2a each structurally resemble the single leaf of FIG. 2 with the two leaves being spirally wrapped around the mandrel in overlapping relationship one upon the other to form a compact roll. A plurality of membrane leaves may be utilized, only two of which are shown for sake of clarity. In some applications the longitudinally-extending plate 23 need not be employed.

Figure 2A:
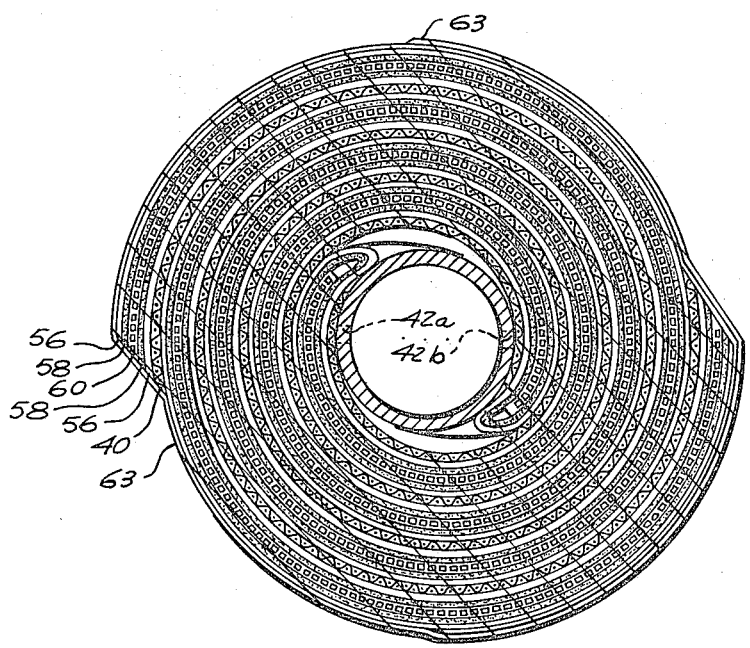
FIG. 2a is a sectional schematic view similarly located as that of FIG. 2, of an alternative embodiment of the module of the invention wherein there are employed two laterally-extending leaves which are spirally wrapped around the mandrel in overlapping relationship one upon the other.

The modules of FIGS. 2 and 2a are each provided with a fiberglass-reinforced Mylar industrial tape wrapping 63 which forms the outermost layer of the respective structures. In some applications it may be desired to wrap the fiberglass-reinforced tape several times around the module for additional strength.

Figure 9:
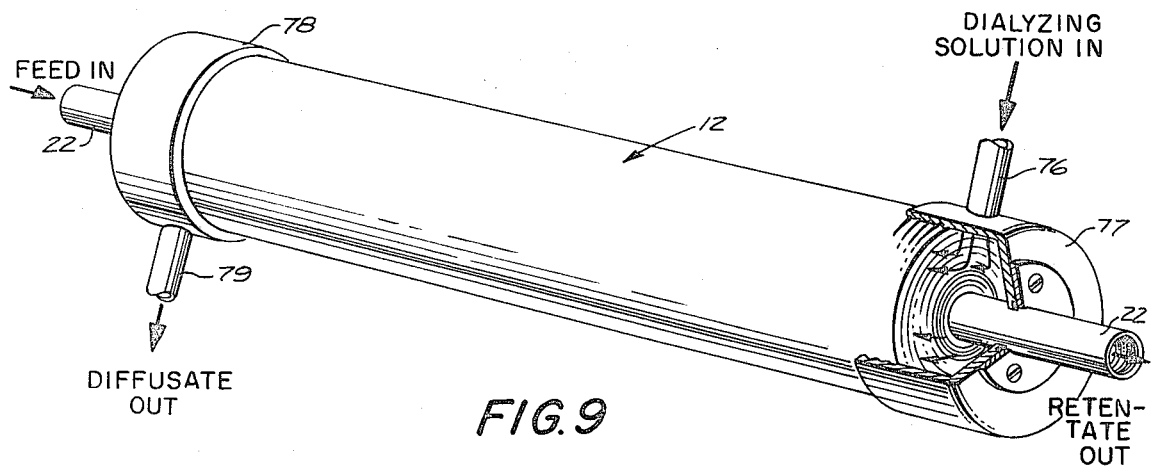
FIG. 9 is a perspective view, partially cutaway, of an installation of the module of the invention for the dialysis treatment of a liquid stream.

FIG. 9 is a perspective view of an installation utilizing the module of the invention in a system for the dialysis of a liquid stream, e.g., the treatment of blood containing harmful constituents which are normally removed in the urine. The module 12 of the invention has been modified to provide means for introducing a second, counter-current flowing fluid stream (dialyzing solution) to one end of the module, together with means for removing the solution upon passage therethrough, now knwon as diffusate, from the other end of the module. The intrastructure of the module 12 may take the form of FIG. 3 wherein the second passageway 34 comprises two thin, connecting open channels 36 and 38. In FIG. 9, the dialyzing solution is introduced via a line 76 and an adapter collar 77 to one end of the module 12, whence the dialyzing solution flows lengthwise of the module through the first fluid passageway 61 (FIG. 3) to the other end of the module where it empties into a second collar member 78 from where it is removed in a line 79. The dialyzing solution upon passage through the first passageway 61 and the acquiring of solutes through the membrane is commonly described in the art as diffusate. Typically, the flow path length of the dialyzing solution in the first passageway 61 is 18 inches to 40 inches (45 to 100 cm) compared with 10 feet to 20 feet (3 to 6 m) path length for the second passageway 34 through which the feed spirally flows. The feed (e.g., blood) upon coming into contact with the membrane is commonly referred to as dialysate and when it exits from the mandrel it is referred to as retentate. An outstanding advantage derived from the configuration of the module of the invention when used in dialysis is that the module allows for a long residence time for the feed (dialysate) and a high flow rate for the dialyzing solution because of the short path length of the first passageway 61. The high flow rate of the dialyzing solution through the first passageway 61, lengthwise of the module, tends to minimize concentration polarization of the solutes at the membrane surface, thereby promoting a higher transfer rate of solutes across the membrane.

The perspective view of FIG. 10 illustrates an installation incorporating the module 12 of the invention in a system designed for the processing of a gas stream to separate a component gas therefrom. The leaf structure illustrated in FIG. 5 is particularly suitable for gas separation. As shown in FIG. 6, the gaseous stream being processed is introduced to the first compartment 24 of the mandrel 22 whence it flows into the first region 36 of the second fluid passageway of FIG. 5, then to the second juxtapositioned region 38 and thence to the second compartment 26 of the mandrel 22 (FIG. 6) from where it is removed as residual gas. With reference to FIG. 10 it is seen that the permeate gas leaves from both ends of the module 12 and collects in the annular gas space 84 of a larger diameter shell 86 whence it is removed in a permeate gas stream through a line 88. In an optional design, the module 12 is snugly positioned in a close-fitting, tubular shell (usually metallic) with means being provided to collect and remove gas permeate from either one or both ends of the tubular shell.

With reference to FIGS. 11 and 12 there is illustrated a reverse osmosis system generally resembling that of FIG. 1, but differing in having a module unit 12 which is designed for higher pressure operations. Brackish water or the like is passed by an inlet through a coupling 20 to mandrel 22 of the module 12. As in the earlier described system of FIG. 1, the effluent feed stream leaves the module 12 via the other end of the mandrel 22, coupling 44 and the exit pipe 46. Water permeate escapes from both ends of the module 12 into the shallow collection basin 50, whence it is removed in a downwardly-extending removal line. The system of FIG. 1, which is intended for relatively low pressure operations, employs a module having for its outer element, a fiberglass-reinforced Mylar tape wrapping 63 (FIG. 2). The module 12 of FIG. 11 may or may not employ the outer circumferential full-length tape wrapping 63 but in a preferred embodiment such wrapping is utilized. The module roll may be held in a partially restrained form (in preparation for insertion into tubular element 90) by means other than the outer wrapping 63, e.g., spaced circumferential bands. As best seen in FIG. 12, the compact module roll is snugly situated in a close-fitting tubular member 90 which member provides additional restraint to unspiralling of the module roll, thus permitting use of the module at still higher pressures.

In the embodiment of the module illustrated in FIGS. 11 and 12, the metallic tubular member 90 has an elongated slit 92 running the length thereof with spaced clamping means 94, each of which comprises lugs 98 on opposite sides of the slit 92. Each clamping mechanism 94 employs a bolt 96 which spans the slit 92, extending through holes of the opposing lugs 98 and having a nut 100 at its upper threaded end. The clamping means 94 in their closed position firmly compress the metallic tube 90 about the encircled module roll.

In assembling the module 12 of FIGS. 11 and 12, the tubular shell 90 is slightly spread by exerting an expanding force between the lugs 98 and positioning a spreading element (not shown) between the lugs 98 to hold the shell in an expanded first position. The metallic tube 90 in its expanded first position has an inside diameter larger than the partially restrained diameter of the compact module roll prior to its positioning within the tubular member 90. This relationship of dimensions facilitates positioning of the partially restrained compact module in the expanded metallic tube 90. The metallic tube 90 is then released to assume its cylindrical shape by removal of the temporary spreader means located between the opposing lugs 98 of the two clamping mechanisms 94. The nuts 100 of the two bolts 96 are tightened down to maintain the compact module roll in compression during operation. It will be appreciated that other clamping means may be utilized, for example, steel bands and the like. The unexpanded inside diameter of the outer metallic tube 90 will range in dimension from equal to or as much as 10% less than the outer diameter of the partially restrained compact module roll prior to its positioning within the tubular member in its expanded position. A more typical range in dimensional differences of the unexpanded inside diameter of the metal tube 90 and the partially restrained outside diameter of the compact module roll is 1-3%.

The reinforced module 12 of FIG. 11 is especially suitable for reverse osmosis treatment of liquids and gas separations and in such operations, the second passageway 34 will desirably employ as shown in FIG. 5 a full width polymeric netting. When operating at elevated pressure it is frequently desirable to employ spaced perforations or small diameter holes rather than the elongated slit 30 for introduction of the fluid stream to the second passageway 34 of the leaf structure, and to make a similar substitution for the slit 42. The reinforced module 12 of FIG. 11 when used for gas separation may be conveniently utilized in the system of FIG. 10 which employs an outer vessel or shell 86 to collect the permeate gas which is removed via a line 88.

A preferred embodiment of the module of FIGS. 11 and 12 is approximately 39 inches (1 m) long and utilizes a two leaf structure with each leaf having a laterally-extending length of 70 feet (21 m), thus giving a fluid flow path of approximately 140 (42 m). The polymeric grid netting 64 of FIG. 5 which is desirably employed in this embodiment has a thickness of approximately 35 mils (1 mm) or more. The foregoing structure will provide a compact module roll of approximately 12 inches (30 cm) in diameter which is housed in a schedule 30 steel tubular shell. The foregoing structure provides approximately 800 square feet (74 square meters) of membrane surface exposed to the fluid stream being treated.

What is claimed is:

1. A module of a convolute design employing a permselective membrane for use in separating a permeate from a fluid feed mixture, said module comprising:

a generally-hollow mandrel having a wall intermediate its length dividing the mandrel into a first compartment and a second compartment with means for introducing a fluid feed stream to the first compartment of said mandrel and means for removing an effluent fluid stream from the second compartment of the mandrel;

two permselective membranes spaced from each other by a backing to provide a first fluid passageway therebetween;

means defining a second fluid passageway for presenting the fluid feed to the two membranes upon the spiral wrapping of said two membranes about the mandrel to form a compact module roll, said second passageway beiing divided into two juxtapositioned regions which two regions at a spaced distance first compartment the mandrel are interconnected to direct flow of the fluid feed from the first region into the second region with said first region being in fluid communication with the first-compartment of the mandrel to receive the incoming fluid feed and said second region being in fluid communication with the second compartment of the mandrel whence the effluent fluid stream is removed;

means for removal of fluid from the first fluid passageway to exterior of the module; and means restraining the unspiralling of the compact module roll under operational conditions.

2. A module in accordance with claim 1 wherein the permselective membranes are cast on a permeable polymeric cloth and the polymeric cloth acts as a backing material in the first fluid passageway.

3. A module in accordance with claim 1 wherein a permeable tricot spacer cloth is positioned between the two permselective membranes, acting as a backing material to define the first fluid passageway, with the opening of said tricot spacer cloth being relatively loose so as to promote high longitudinal fluid flow in a general direction parallel to and exteriorly of the mandrel.

4. A module in accordance with claim 1 wherein the two permselective membranes are cast on a permeable polymeric cloth and a tricot spacer cloth is located therebetween with said permeable polymeric cloths together with the tricot spacer cloth defining the first fluid passageway.

5. A module in accordance with claim 1 wherein the means defining the second fluid passageway is an open grid sheet material through which the fluid feed may readily flow.

6. A module in accordance with claim 1 wherein the second fluid passageway comprises two thin, open channels which provide the two juxtapositioned regions.

7. A module in accordance with claim 1 wherein the two successive juxtapositioned fluid flow regions progressively diminish in width in direction of fluid flow.

8. A module in accordance with claim 1 wherein the means defining the second fluid passageway includes an open polymeric grid material having adhesive lines which adhesive lines serve to define the boundaries of the two juxtapositioned regions and to bond the structure layers together upon the spirally wrapping of the two membranes about the mandrel.

9. A module in accordance with claim 8 wherein the two successive juxtapositioned fluid flow regions progressively diminish in width in direction of fluid flow.

10. A module in accordance with claim 8 wherein each of the two juxtapositioned regions comprise thin, open channels that promote hydrodynamic shearing at the adjacent membrane surfaces with fluid flow therethrough, thereby minimizing concentration polarization and increasing permeate flow across the membranes into the first passageway.

11. A module in accordance with claim 10 wherein the channels have a depth in the range of 10 to 100 mils.

12. A module in accordance with claim 10 wherein the two successive juxtapositioned fluid flow regions progressively diminish in width in direction of fluid flow.

13. A module in accordance with claim 1 wherein there are at least two generally, laterally-extending coextensive leaves which are separately in fluid communication with the two compartment mandrel with each leaf comprising as defined heretofore two permselective membranes with a first fluid passageway therebetween, and means defining a second fluid passageway for presenting the fluid feed to the outside of said two membranes of the respective leaves, said plurality of leaves being spirally wrapped around the mandrel in overlapping relationship one upon the other to form a compact module roll.

14. A module in accordance with claim 1 especially adapted for dialysis operation wherein there is a means for introducing a second fluid stream to the first fluid passageway at one end of the module and a means for removal of said second fluid stream from the first fluid passageway at the other end of the module.

15. A module in accordance with claim 1 especially adapted for separating a permeate gas from a gaseous feed stream introduced to the first compartment of said mandrel for flow through the second fluid passageway wherein the module is positioned in a closed vessel and means is provided for collecting and removing gas permeate from the first passageway.

16. A module in accordance with claim 1 wherein the means restraining the unspiralling of the compact module roll under operational conditions comprises an outer tape wrapping about the circumference thereof, said tape wrapping being of the length of the module and covering the outer surface of said module roll.

17. A module in accordance with claim 16 wherein the structure described is snugly situated in a close fitting tubular member which member provides additional restraint to unspiralling, thus permitting use of the module at still higher pressures.

18. A module in accordance with claim 1 wherein the means restraining the unspiralling of the compact module roll comprises a tubular member which snugly engages the outer circumferential surface of the compact module roll.

19. A module in accordance with claim 18 wherein the tubular member is a metallic tube having an elongated slit running the length thereof with a clamping means spanning the slit which clamping means in its closed position firmly compresses the tube about the encircled module roll.

20. A module in accordance with claim 19 wherein the compact module roll prior to positioning in the metallic tube has a partially restrained diameter and the metallic tube has a first expanded position and a second unexpanded, clamped position, with the metallic tube in its expanded first position having an inside diameter larger than the partially restrained diameter of the compact module roll, thus facilitating in the assembling of the module, the positioning of the partially restrained compact module into the metallic tube in its expanded first position.

* * * * *

UNITED STATES PATENT OFFICE
CERTIFICATE OF CORRECTION

PATENT NO. : 3,872,014
DATED : March 18, 1975
INVENTOR(S) : William J. Schell

It is certified that error appears in the above-identified patent and that said Letters Patent are hereby corrected as shown below:

Column 1, line 56, delete "contract" and insert --contrast--.

Column 7, line 54, delete "feeding" and insert --feed--.

Column 8, line 59, delete "it" and insert --It--.

Column 10, line 14, delete "knwon" and insert --known--.

Column 11, line 3, after "inlet" insert --line--.

Column 12, line 36, after "backing" insert --member--;
line 44, delete "first compartment" and insert --from--.

Column 13, line 36, after "first" insert --fluid--.

Signed and Sealed this eighteenth Day of November 1975

[SEAL]

Attest:

RUTH C. MASON
Attesting Officer

C. MARSHALL DANN
Commissioner of Patents and Trademarks